Feb. 28, 1950  D. H. TAYLOR  2,499,173
POWER TRANSMISSION BELT GUIDE
Filed Aug. 25, 1947
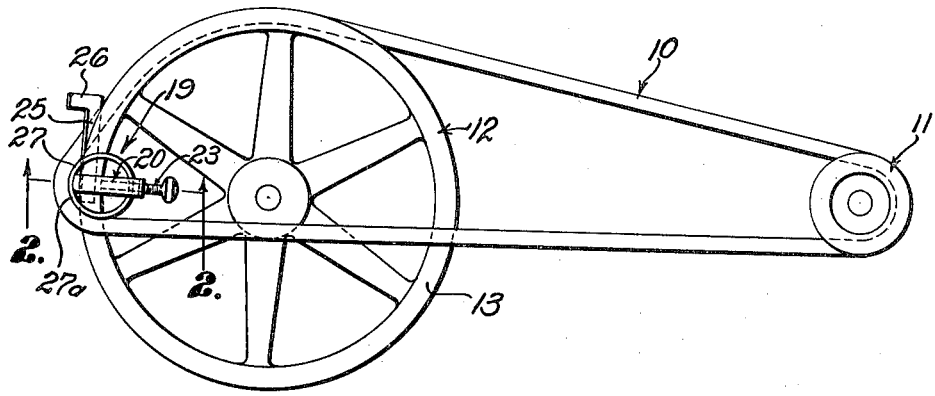
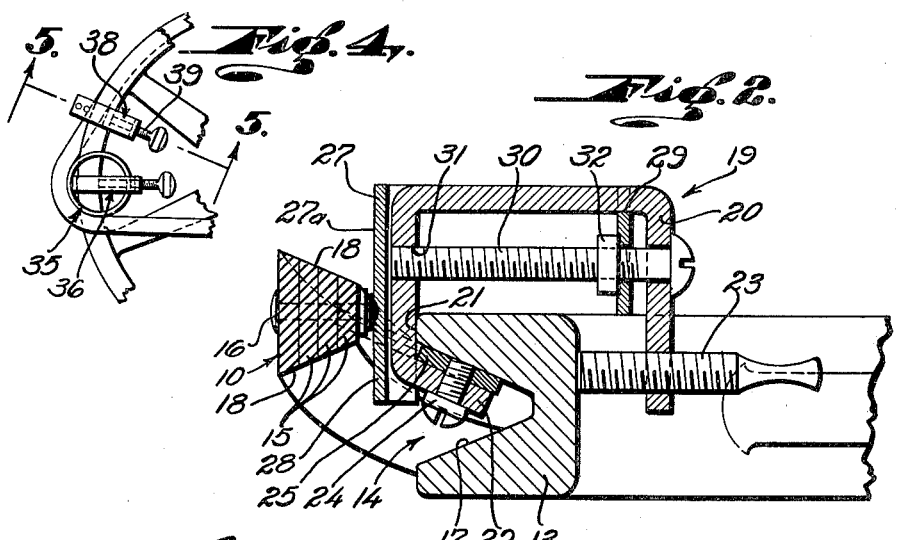
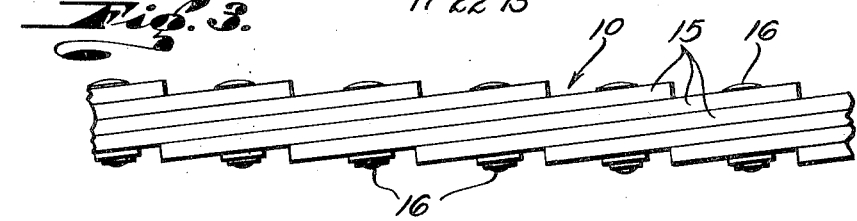
DANIEL H. TAYLOR
INVENTOR.
BY Hcalvin White
ATTORNEY Patented Feb. 28, 1950

2,499,173

UNITED STATES PATENT OFFICE 2,499,173

POWER TRANSMISSION BELT GUIDE

Daniel H. Taylor, South Pasadena, Calif.

Application August 25, 1947, Serial No. 770,341

12 Claims. (Cl. 74—242.7)

This invention has to do with a novel guide device to be used for the application of an endless belt to a peripherally recessed sheave wheel, the device generally being characterized by its capacity for rotation with the wheel to progressively guide the belt into the wheel recess.

The invention has particular adaptability for use in conjunction with V-belts and their application to sheave wheels having correspondingly shaped peripheral recesses. As is generally known, such belts must ultimately assume a highly tensioned condition about the sheaves for effective or efficient power transmission. Thus in some instances, as in the case of the later described segmental type belt, the initial length of the belt may be less than its extent when applied to the sheaves. Accordingly, a difficult problem arises in undertaking to apply such a belt to its sheave without injuring the belt and in any reasonably easy manner.

Heretofore it has been common practice to clamp one portion of the belt to the sheave wheel peripherally, and to rely upon rotation of the wheel, together with the use of other tools, to force and direct the belt into working position in the recess. Such practices have not been satisfactory, not only because of the time and labor required, but also due to the injury caused to the belt by the tools used and the twisting and other conditions to which the belt is subjected as it is forced over the wheel flange at one side of its recess. Insofar as I am aware, the invention marks the first instance in which it has been made possible to quickly and easily apply the belt to its sheave wheel without the slightest injury to the belt.

In accordance with the invention, I apply to the peripheral portion of the sheave wheel, and preferably within its recess, a guide member or blade so positioned as to progressively direct the belt into the recess as the guide rotates with the wheel. Specifically, the guide member may consist of an elongated blade applied directly or flatly to the angular side of the wheel recess, and positioned with relation to a body structure so that the belt traverses and then passes alongside the guide as it enters the recess.

A further feature of the invention is the provision of an associated or body structure which presents a surface curved in the direction of the belt and over which the belt passes as it directly approaches the guide and enters the wheel recess. As will appear, such surface may conveniently be formed on a portion of a body overlying the wheel periphery and applied to a side face of the wheel.

The invention additionally aims to provide a mounting for the guide blade, in the form of an essentially U-shaped bracket clamped to the wheel rim and having a terminal angular portion carrying the blade in a position conforming to the angularity of an adjacent side of the wheel recess. As an example, the curved guide surface over which the belt passes before entering the recess, may be provided by an extended portion of a cylindrical body carried by the bracket.

All the various features and objects of the invention will be understood to best advantage from the following detailed description of an illustrative embodiment shown in the accompanying drawing, in which:

Fig. 1 is a general view showing the guide device carried by a sheave wheel in the course of applying the belt;

Fig. 2 is an enlarged cross-section on line 2—2 of Fig. 1;

Fig. 3 is a side view showing a typical form of V-belt;

Fig. 4 is a fragmentary view showing a variational form of the invention in the aspect of the invention; and Fig. 5 is an enlarged cross-section on line 5—5 of Fig. 4.

The showing of Fig. 1 illustrates the procedure of applying a V-belt 10 running from one location such as sheave wheel 11 to the larger diameter sheave wheel 12, the rim portion 13 of which has a peripheral recess 14, see Fig. 2. Merely as illustrative, the V-belt 10 may be of a known type comprising a succession of angular or inclined overlapping laminations 15 interconnected by metallic fasteners 16, any of which may be removed to separate the belt at any location corresponding to the spacing of the fasteners, and which may then be reinserted to interconnect the ends of a measured length in endless form. The sheave wheel recess 14 may be substantially V-shaped, having straight sides 17 corresponding in angularity to the edges 18 of the belt.

The belt guide assembly, generally indicated at 19 comprises in its typical, though preferred form, a substantially U-shaped metal bracket 20 adapted to bear at 21 against the peripheral surface of the wheel 12, and having an angular end portion 22 received within the recess 14. The bracket carries a screw 23 which may be tightened against the inside surface of the wheel rim 13, to tightly clamp the bracket in the position illustrated in Fig. 2. The angular end portion 22 of the bracket is attached by screw 24 to a flat elongated guide blade 25 having an outwardly turned end portion 26 and bearing flatly against one side 17 of the recess 14. The blade 25 has sufficient longitudinal extent to be traversed by the belt while in engagement with its edge 18, and to extend beyond or out of the recess 14 as illustrated in Fig. 1.

The bracket carries a cylindrical body member 27 adapted to bear against the side of the wheel 12, and having a portion 28 overlapping the periphery of the wheel as shown. The bracket 20 passes through a notch 29 into the body 27 and is attached thereto by a screw 30 threaded into the bracket at 31 and carrying a nut 32 which may be tightened against the body to maintain it in rigid relation to the bracket.

In considering its use, assume the guide assembly to be applied and clamped to the sheave wheel, as illustrated in Fig. 1, with the upper span of the belt entering the wheel recess 14 to the point of engagement with the inner surface of the guide blade 25. From that point the belt traverses the guide blade in leaving the recess and passing outwardly over the cylindrical surface 27a of the body projection 27. The belt then continues into the lower span lying against the side face of the sheave wheel. As the latter is rotated to carry the guide assembly downward, the belt, being guided and laterally supported by the blade 25, progressively enters the sheave wheel recess while supported on the smooth cylindrical surface 27a. Thus the combined effects of the guide blade position and angularity, together with the continuing bottom support given the belt in passing over the surface 27a, assure confinement of the belt for progressive entry into the wheel recess, and at all times maintain the belt against any distortion or wear that could possibly injure the belt during the course of its application to the wheel.

The functional characteristics of the variational form of the invention shown in Figs. 4 and 5, are generally similar to the described embodiment, while structurally differing in that the curved surface guide and the wheel recess entering guide are formed and mounted as two separate parts. Here the cylindrical body 35, corresponding to the above described body 27, is applied to the wheel rim by a clamp member 36 corresponding to clamp 20 in Fig. 2, except that the clamp does not carry the blade 25. Instead the function of the previously described guide blade is served by a guide piece or blade 37 carried by a clamp 38 applied to the wheel at a location substantially as indicated in Fig. 4. The clamp 38, secured to the wheel by screw 39, carries the blade 37 in a position corresponding to the angularity of the wheel recess side, so that the latter is flatly engaged by the blade. As before, the belt is laterally supported and guided into the wheel recess by blade 37, while supported on the curved surface of body 35, as the belt extends from the side of the wheel into its recess.

I claim:

1. A guide for applying a tensioned endless belt to a sheave wheel having a peripheral recess, comprising an elongated guide blade positioned so that one side face of the blade engages and guides the belt into said recess, means for attaching said blade to the wheel with the opposite side face of the blade engaged against the wheel at one side of said recess, and means for guiding the belt into the recess so that the belt traverses the outer edge of the blade.

2. A guide for applying a tensioned endless belt to a sheave wheel having a peripheral recess, comprising an elongated guide blade positioned so that one side face of the blade engages and guides the belt into said recess, means for attaching said blade to the wheel with the opposite side face of the blade engaged against the wheel at one side of said recess, and means presenting a surface curved in the direction of the belt and engaged by the belt directly in advance of its extent into said recess and engagement with said blade.

3. A guide for applying a tensioned endless belt to a sheave wheel having a peripheral recess comprising a guide member positioned to engage and guide the belt into said recess, a body carrying said blade and presenting a surface curved in the direction of the belt and engaged by the belt directly in advance of its engagement by said guide member, and means attaching said body to the wheel for rotation therewith.

4. A guide for applying a tensioned endless V-belt to a sheave wheel having a substantially V-shaped peripheral recess, comprising a guide member positioned to engage and guide the belt into said recess, and a screw attached to said member and engageable against the wheel for securing said member thereto so that the member is received within and bears against one side surface of said recess.

5. A guide for applying a tensioned endless belt to a sheave wheel having a peripheral recess, comprising a body applicable to the side of the wheel and having a curved belt engaging surface overlapping the recessed periphery of the wheel, a guide member connected to the body and positioned in said recess to engage the belt as it leaves said surface and to guide the belt into the recess, and means attaching said body to the wheel.

6. A guide for applying a tensioned endless belt to a sheave wheel having a peripheral recess, comprising a body applicable to the side of the wheel and having a curved belt engaging surface overlapping the recessed periphery of the wheel, a bracket attached to the body and having within said recess an angularly turned end portion, a guide blade carried by said end portion of the bracket and engaging the side of the wheel recess so that the blade is traversed by the belt leaving said curved surface and guides the belt into the recess, and means attaching said bracket to the wheel.

7. A guide for applying a tensioned endless belt to a sheave wheel having a peripheral recess, comprising a cylindrical body applicable to the side of the wheel and having a curved belt engaging surface overlapping the recessed periphery of the wheel, a bracket extending inside the body and having within said recess an angularly turned end portion, a guide blade carried by said end portion of the bracket and engaging the side of the wheel recess so that the blade is traversed by the belt leaving said curved surface and guides the belt into the recess, and means attaching said bracket to the wheel.

8. A guide for applying a tensioned endless belt to a sheave wheel having a peripheral recess, comprising a substantially U-shaped bracket applicable to an outer portion of the wheel and having within said recess an outer angularly turned end, a guide blade carried by said turned end of the bracket to be positioned against one side of said recess, and means clamping the inner end of the bracket to the wheel.

9. A guide for applying a tensioned endless belt to a sheave wheel having a peripheral recess, comprising a substantially U-shaped bracket applicable to an outer portion of the wheel and having within said recess an outer angularly turned end, a guide blade carried by said turned end of the bracket to be positioned against one side of said recess, means clamping the inner end of the bracket to the wheel, and means carried by said bracket and presenting at the outside of the wheel a surface curved in the direction of the belt and over which the belt passes to engage the side of said blade and enter the wheel recess.

10. A guide for applying a tensioned endless belt to a sheave wheel having a peripheral recess, comprising a guide member to be received in the wheel recess and to engage and guide the belt into said recess, and means including a clamp screwed to said member and adapted to extend about one side of the wheel for attaching said member to the wheel for rotation therewith and with the member engaged against the surface of said recess.

11. A guide for applying a tensioned endless belt to a sheave wheel having a peripheral recess and an annular face inwardly from said recess, comprising an elongated guide blade to be positioned so that its side face engages and guides the belt into said recess, and a clamp carrying said blade including a screw engageable against said annular face of the wheel to secure the guide blade within the wheel recess in engagement with the surface thereof.

12. A guide for applying a tensioned endless belt to a sheave wheel having a peripheral recess, comprising an elongated guide blade positioned so that one side face of the blade engages and guides the belt into said recess, and means for attaching said blade to the wheel with the opposite side face of the blade positioned within and engaged against one side surface of said recess said means comprising a clamp arm one end of which is attached to and extends angularly from said member, the opposite end of the arm being turned, and a wheel engaging screw extending through said turned end.

DANIEL H. TAYLOR.

REFERENCES CITED

The following references are of record in the file of this patent:

UNITED STATES PATENTS

| Number | Name | Date |
| --- | --- | --- |
| 244,279 | McConnell | July 12, 1881 |
| 257,323 | Hartley | May 2, 1882 |
| 333,947 | Houghtaling | Jan. 5, 1886 |